Feb. 25, 1930.                F. FRANZ                 1,748,645
        APPARATUS FOR TESTING THE BALANCE WHEEL UNITS OF CLOCKS, WATCHES, ETC
                        Filed July 14, 1928      5 Sheets-Sheet 1
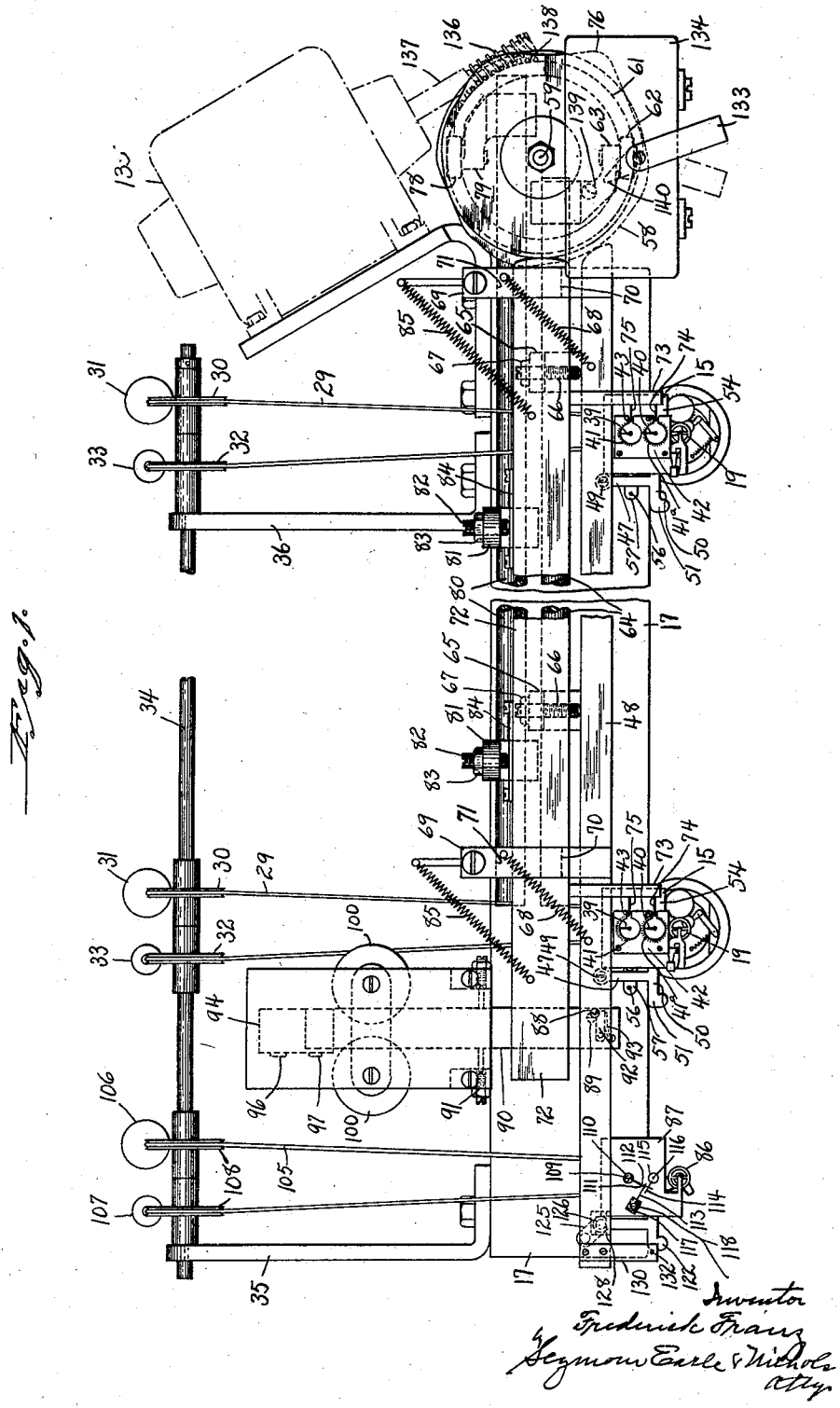

Feb. 25, 1930.  F. FRANZ  1,748,645
APPARATUS FOR TESTING THE BALANCE WHEEL UNITS OF CLOCKS, WATCHES, ETC
Filed July 14, 1928   5 Sheets-Sheet 2
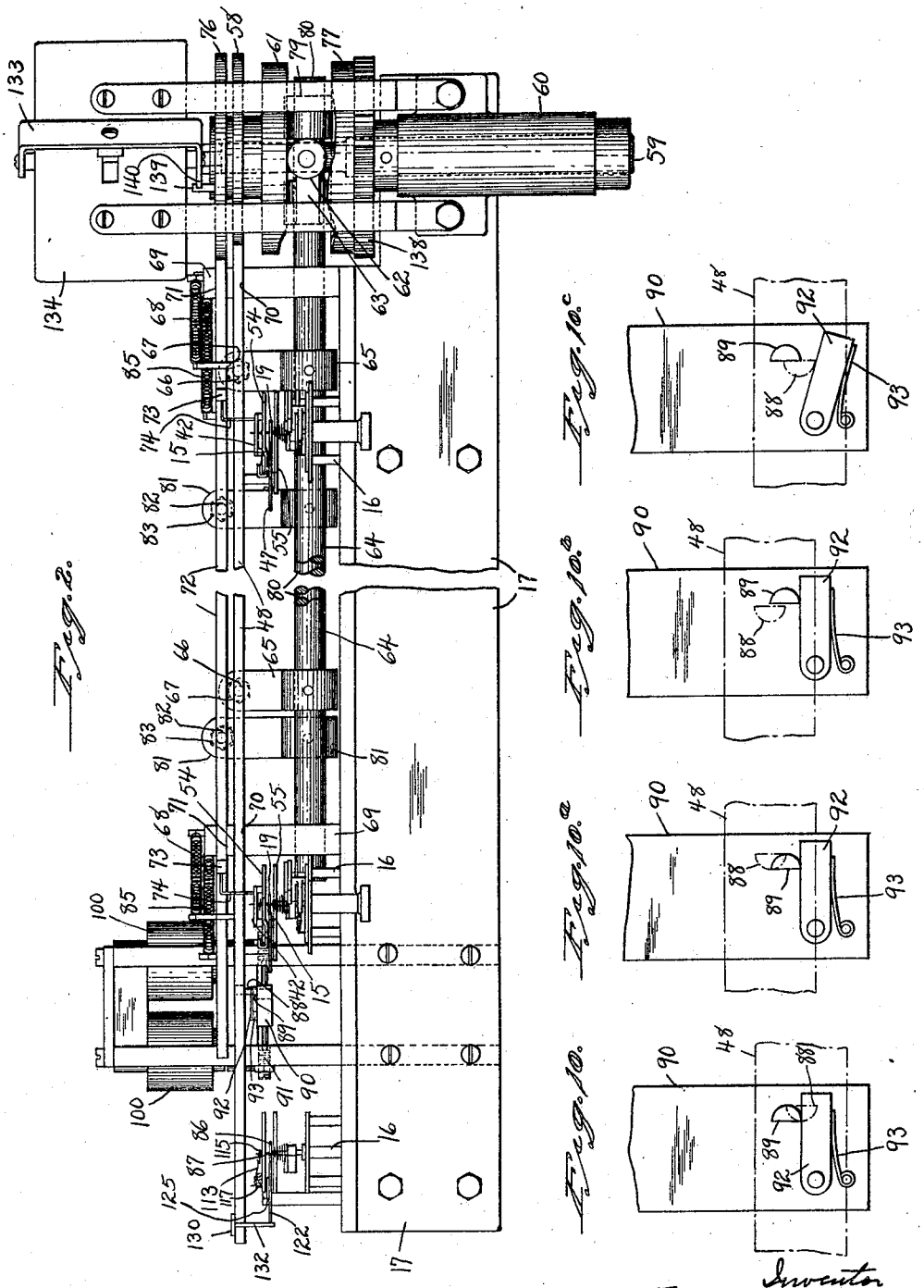

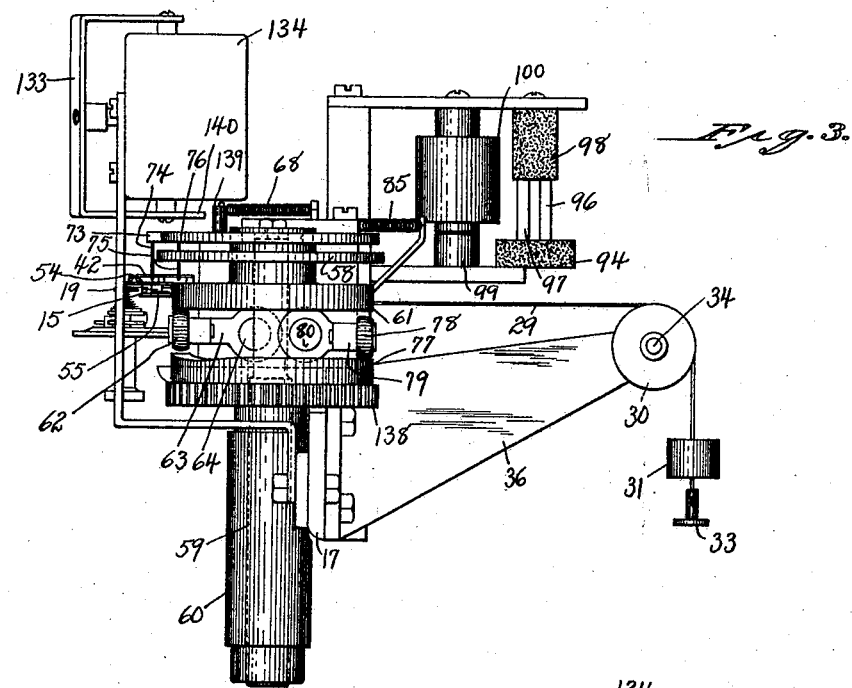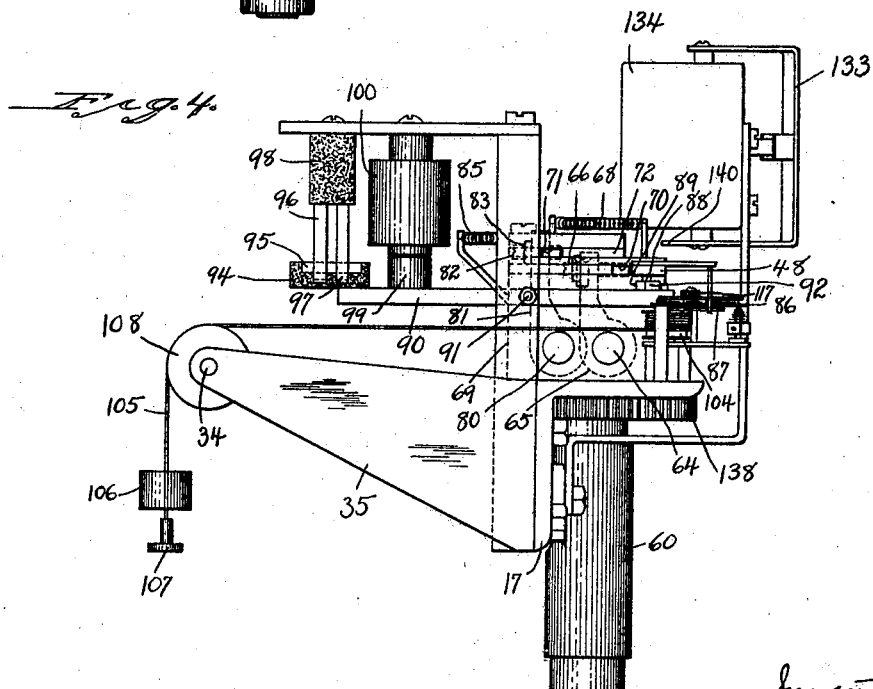

Feb. 25, 1930.  F. FRANZ  1,748,645
APPARATUS FOR TESTING THE BALANCE WHEEL UNITS OF CLOCKS, WATCHES, ETC
Filed July 14, 1928   5 Sheets-Sheet 4
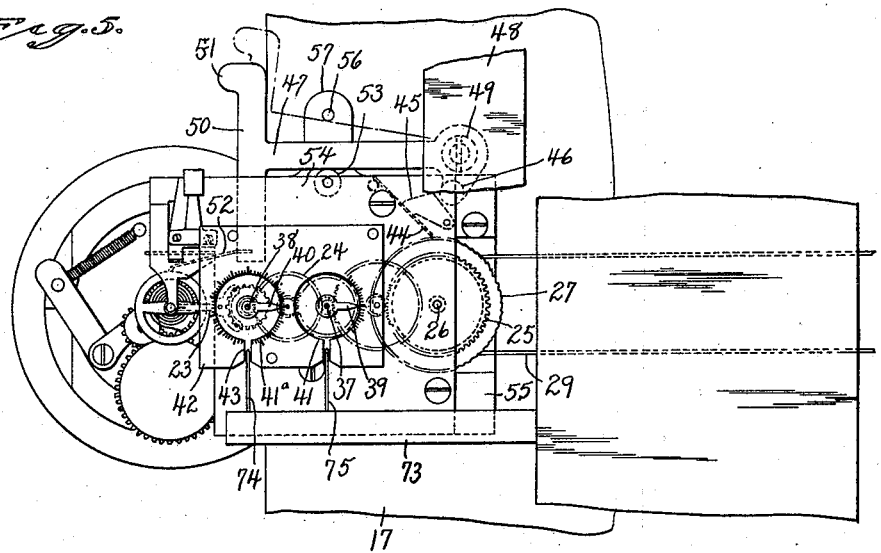
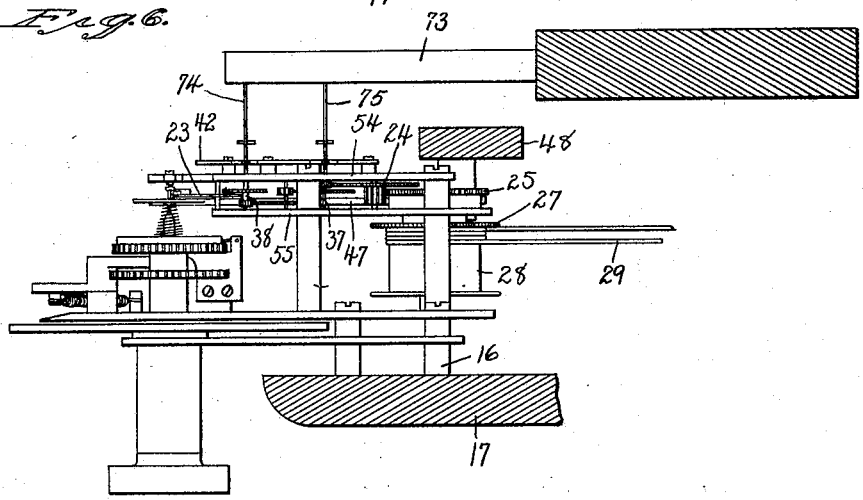
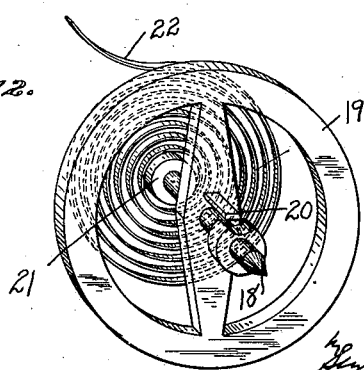

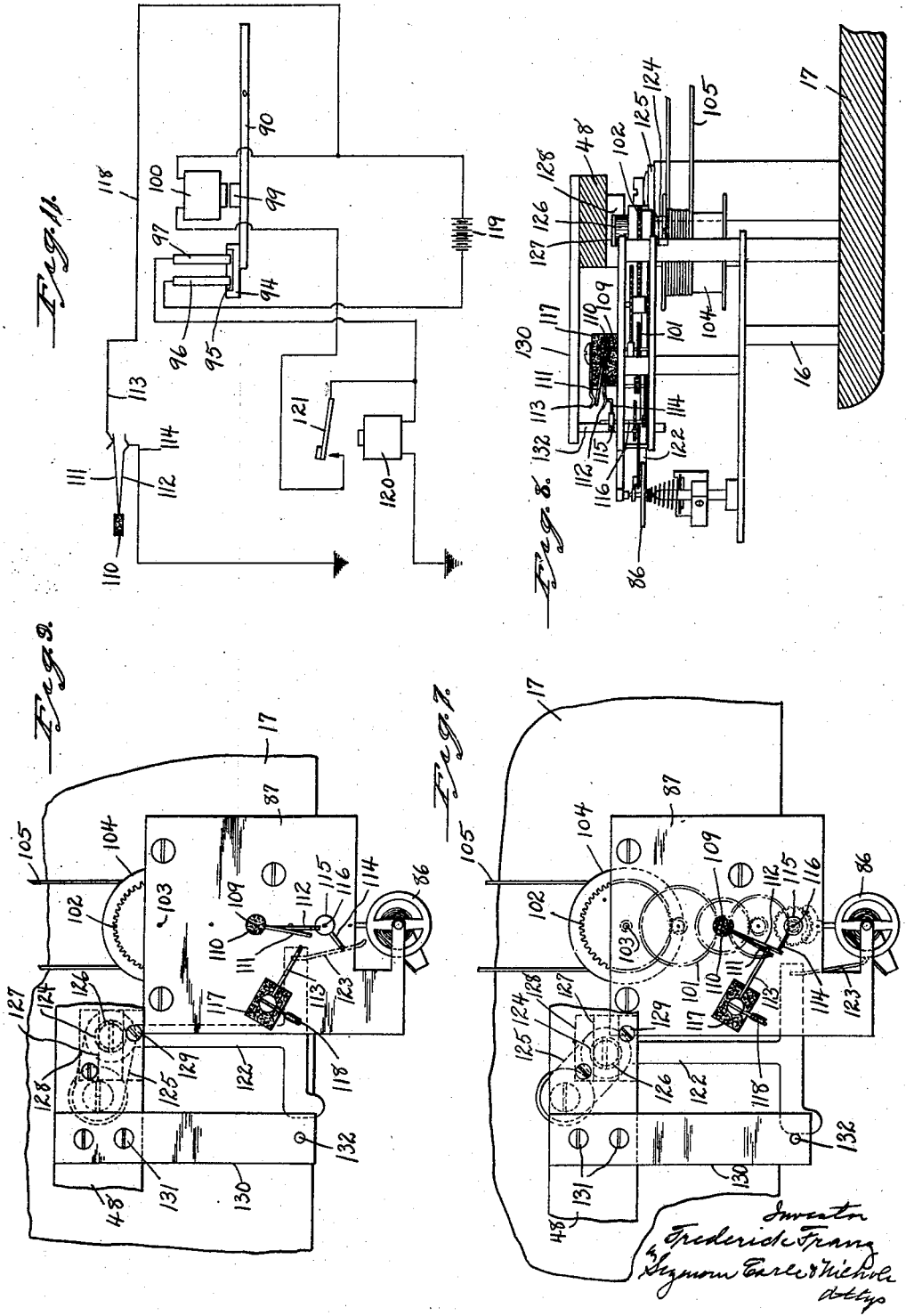

Patented Feb. 25, 1930

1,748,645

UNITED STATES PATENT OFFICE

FREDERICK FRANZ, OF HAMDEN, CONNECTICUT, ASSIGNOR TO THE NEW HAVEN CLOCK CO., OF NEW HAVEN, CONNECTICUT, A CORPORATION

APPARATUS FOR TESTING THE BALANCE-WHEEL UNITS OF CLOCKS, WATCHES, ETC.

Application filed July 14, 1928. Serial No. 292,704.

This invention relates to an improvement in apparatus for testing the balance-wheel units of clocks, watches, etc., to determine by actual trial the proper length of the hair-spring thereof, before the units are installed in the clock or watch movement for which they are intended.

The object of this invention is to provide an accurate and reliable apparatus of the character referred to constructed with particular reference to convenience, ease and rapidity of operation.

With this object in view my invention consists in an apparatus for testing the balance-wheel units of clocks, watches, etc., characterized by its provision with a master-movement and a plurality of test-movements, each of which latter is adapted to receive a balance-wheel unit to be tested and is provided with one or more indicating-pointers for recording the oscillation of a given unit during a trial period; automatic indexing means for restoring the said pointers to normal position; starting-and-stopping means for starting the said test movement and the said master-movement and for automatically stopping the same; and means controlled by the said master-movement for causing the said starting-and-stopping means to stop the said movements at the termination of a test period.

My invention further consists in an apparatus for testing the balance-wheel units of clocks, watches, etc., characterized as above and having certain details of construction and combinations of parts as will be hereinafter described and particularly recited in the claims.

In the accompanying drawings:

Fig. 1 is a broken top or plan view of a balance-wheel-unit testing apparatus constructed in accordance with my invention, the parts being shown in their normal positions of rest;

Fig. 2 is a view thereof in front elevation;

Fig. 3 is a view thereof looking toward the right-hand end of the apparatus;

Fig. 4 is a corresponding view looking toward the left-hand end of the apparatus;

Fig. 5 is an enlarged-scale plan view of one of the test-movements together with portions of the frame, starting-and-stopping bar and the indexing-bar;

Fig. 6 is a side view thereof;

Fig. 7 is an enlarged-scale plan view of the master-movement together with portions of the frame and the starting-and-stopping bar;

Fig. 8 is a side view thereof;

Fig. 9 is a view corresponding to Fig. 7 but showing the parts in the positions which they assume after the starting-and-stopping bar, together with the starting-and-stopping finger, has moved rearward to start the master-movement;

Fig. 10 is a broken top or plan view of the outer end of the latch-bar showing by broken lines a portion of the starting-and-stopping bar, together with the latch-pin depending therefrom, the parts being shown in their normal or at rest position;

Figs. 10ª, 10ᵇ and 10ᶜ are corresponding views showing the positions of the parts as the result of successive phases of their movement;

Fig. 11 is a schematic view indicating the control-circuit and parts; and

Fig. 12 is an enlarged-scale detached perspective view of a balance-wheel unit of the type adapted to be tested in the apparatus shown.

In carrying out my invention as herein shown I employ a plurality of corresponding test-movements 15 (only two of which are shown) which correspond in their main features to the clock movements in which the hair-spring and balance-wheel units to be tested are to be installed. The said test-movements are mounted by means of pillars 16 to the upper or horizontal leg of an angle-iron frame-piece 17 which extends the entire length of the machine and supports the various elements as will hereinafter appear.

Each test-movement is provided with readily releasable means (herein requiring no detailed description) for holding a balance-wheel unit which as shown in Fig. 12 of the drawings comprises a staff 18, a balance-wheel 19 having an impulse-pin 20 and a collet 21 to which latter one end of a hairspring 22 is secured in the usual manner.

The said balance-wheel unit is designed to be oscillated in the test-movement in the same manner as it would be when finally installed in a clock. Since all of the test-movements correspond, a description of one will serve for all. For the purpose just mentioned, the impulse-pin 20 of the balance-wheel is engaged by an escapement-lever 23 driven in the usual way through a gear-train 24 by means of a main-wheel 25 secured to a main-arbor 26 which also has secured to it a ratchet-wheel 27 and a driving-drum 28. The said drum 28 has wrapped around it a driving-cord 29, one of the ends of which runs over an idler-pulley 30 and has attached to it a driving-weight 31.

The opposite end of the driving-cord 29 runs over an idler-pulley 32 and has secured to it a relatively small tension-weight 33. The idler-pulleys 30 and 32 of the several test-movements are mounted upon a long horizontal rod 34 supported in the outer ends of brackets 35 and 36 projecting rearward from the frame-piece 17.

Each test-movement has the upper end of its third-wheel arbor 37 and its escapement-wheel arbor 38 respectively provided with pointers 39 and 40 frictionally coupled thereto and exposed to view respectively through circular openings 41 and 41ª in a guard-plate 42 secured to the upper face of the test-movements and having radial notches 43 intersecting the said openings 41 for the purpose as will hereinafter appear.

During the operation of removing one balance-wheel unit from the test-movement and before the installing of a new balance-wheel unit to be tested, it is desirable to prevent the driving-train 24 from running. For this purpose I provide a back-off finger 44 which is carried by a swinging-lever 45 and is adapted to engage the ratchet-wheel 27 to prevent the rotation of the main-arbor 26 as will hereinafter appear.

The said lever 45 is rocked for the purpose just above mentioned, by means of a pin 46 depending from a T-shaped starting-and-stopping arm 47 which is pivotally mounted upon the underface of a long starting-and-stopping bar 48 which is adapted to move both longitudinally and transversely as will be hereinafter described. The said starting-and-stopping arm is secured to the starting-and-stopping bar by means of a screw-stud 49 which is adjusted so as to yieldingly hold the said arm 47 by friction in any position into which it may be moved.

The forward end of the T-shaped starting-and-stopping arm 47 is formed with a transverse bar 50 having a finger-piece 51 at one end and carrying at its opposite end a resilient starting-and-stopping finger 52 which is positioned so as to engage the periphery of the balance-wheel 19. The swinging movement of the starting-and-stopping arm 47 is limited in one direction by a roller 53 mounted between the movement-plates 54 and 55 of the test-movement while its movement in the opposite direction is limited by a stop-pin 56 upstanding from an offsetting-arm 57 of the said rear movement-plate 55.

As above stated the starting-and-stopping bar 48 has imparted to it both longitudinal and transverse movements which movements correspondingly effect the starting-and-stopping arms and fingers of each test-movement. To effect the longitudinal movement of the starting-and-stopping bar 48 the right-hand end of the same as viewed in Figs. 1 and 2 engages the periphery of a disk-cam 58 which is mounted upon a vertical cam-shaft 59 rotating in a bearing 60 secured to the front face of the frame-piece 17. The transverse movement of the said starting-and-stopping bar is effectd by means of a cup-shaped cam 61 also secured to the cam-shaft 59 and engaging a roller 62 carried at the outer end of a short lever-arm 63 secured to a rock-shaft 64 extending beneath the starting-and-stopping bar 17, parallel therewith and provided near each of its respective opposite ends with an upstanding arm 65 each of which in turn carries a set-screw 66 engaging the rear edge of the said bar 48 and locked in adjusted position by means of a check-nut 67.

The right-hand end of the bar 48 and the roller 62 are held in engagement with the respective cams 58 and 61 by means of a pair of diagonally-arranged helical springs 68 connected at one end to the said bar near the respective ends thereof and connected at their opposite ends to guide-blocks 69 which upstand from the frame-piece 17 near its respective opposite ends.

The guide-blocks 69, just above referred to are each formed with forwardly-facing guide-notches 70 which receive and guide the said starting-and-stopping bar 48 near its respective opposite ends. The said guide-blocks are also formed with forwardly-opening guide-notches 71 which in turn receive and guide the opposite ends of an indexing-bar 72 which lies parallel with and slightly above and to the rear of the starting-and-stopping bar 48 aforesaid.

Adjacent each of the test-movements 15 the forward edge of the indexing-bar 72 is provided with a forwardly-extending indexing-arm 73, each of which is provided with two depending indexing-fingers 74 and 75, the lower ends of which are reduced in diameter, and when at rest are located in the notches 43 leading out of the circular openings 41 in the guard-plate 42 of the respective test-movements.

The indexing-bar, together with the indexing fingers 74 and 75 carried by it, has imparted to it a short true rectilinear motion as well as a rotary motion for the purpose of restoring the pointers 39 and 40 to a zero position with respect to the graduations marked upon the guard-plate 42 around each of the openings 41 therein as will hereinafter appear.

For the purpose of imparting longitudinal movement to the indexing-bar 72, which motion during certain phases of the operation of my improved apparatus is supplemented by a simultaneous transverse movement of the said bar to cause the same and the indexing-fingers 74 and 75 to move in a circular path, I abut the right-hand end of the said bar against the periphery of a disk-like cam 76 mounted upon the extreme upper end of the cam-shaft 59 before referred to.

To provide for moving the indexing-bar transversely in consonance with its transverse movement, I employ a cup-shaped cam 77 which is engaged by a roller 78 mounted upon the outer end of a lever-arm 79 mounted upon the extreme right-hand end of a rock-shaft 80 which parallels the said indexing-bar and the complementary rock-shaft 64 before described.

Near each of its respective opposite ends the said rock-shaft 80 is provided with two upstanding arms 81 carrying at their upper ends set-screws 82 locked in adjusted position by lock-nuts 83 and having their forward ends abutted against hardened bearing-plates 84 secured to the rear edge of the indexing-bar as clearly shown in Fig. 1. The right-hand end of the said indexing-bar is held against the periphery of the cam 76 by a pair of diagonally-arranged springs 85 which also act through the mediary of the arms 81 and rock-shaft 80 to hold the roller 78 in engagement with the cam-surface of the cam 77.

For the purpose of holding the starting-and-stopping bar 48 in its left-hand position, so as to hold the starting-and-stopping fingers 52 out of engagement with the balance-wheels 19 in the respective test-movements and also to hold a stop-finger out of engagement with the balance-wheel 86 of the master-movement 87 to be later described, I provide the said starting-and-stopping bar with a depending latch-pin 88 semicircular in cross-section and adapted to co-act with a similarly-shaped latch-pin 89 upstanding from a transversely-arranged latch-bar 90 which is pivoted about midway of its length as at 91 and also carries at its front end adjacent the latch-pin 89 a pivotal guard-dog 92 oscillating in the horizontal plane upon the upper face of the said latch-bar and of the same height as the said latch-pin 89 against which it is normally held by a spring 93.

The rear reach of the latch-bar 90 carries a block 94 of insulating material which in turn carries upon one of its side faces a metallic switch-plate 95 which is adapted to close the circuit between a pair of complementary spring contact-arms 96 and 97 mounted upon an insulated base 98 so as to be normally insulated from each other and having their lower ends inwardly turned for contact with the plate 95. The latch-bar 90 is also provided near its rear end with an armature 99 acted upon by a pair of electro-magnets 100 controlled by the master-movement 87 to release the starting-and-stopping bar 48 to the action of its springs 68 for the purpose of stopping both the master-movement and the several test-movements at the expiration of a predetermined test period.

The master-movement 87 before referred to, like the test-movements, is a time-movement especially selected for its accuracy and comprises the usual train 101 driven by a main-wheel 102 mounted upon the main-arbor 103 which also carries a drum 104 around which is wrapped a driving-cord 105 one end of which is provided with a driving-weight 106, and the opposite ends with a relatively small tension weight 107. The said cord runs over idler-pulleys 108 mounted upon the horizontal rod 34 before referred to.

For the purpose of energizing the magnet 100 at the termination of a predetermined test period in order to release the starting-and-stopping bar 48 and hence stop the respective balance-wheels of the several test-movements and also the balance-wheel of the master-movement so that the degree of correctness of the balance-wheel units being tested may be determined by the indications of the several pointers 39 and 40, I provide the upper end of the third-wheel arbor 109 of the master-movement with a disk 110 of insulating material in which is mounted, so as to be insulated from the said arbor, a contact-member comprising an upper contact-finger 111 and a lower contact-finger 112 respectively adapted to engage and electrically connect a stationary contact-finger 113 and a rotary contact-finger 114 which latter is mounted in a metallic disk 115 secured to the upper end of the escapement-wheel arbor 116 with which the said contact-finger 114 is in electrical contact.

The stationary contact-finger 113 is secured to a block 117 of insulating material mounted upon the upper face of the master-movement 87. Leading from the said contact-finger 113 is a wire 118 which leads to a storage battery 119 so that when, in the running of the master-movement, the contact-finger 111 and its complementary contact-finger 112 are brought into engagement respectively with the stationary contact-finger 113 and the revolving contact-finger 114, current will flow through an electro-magnetic relay-coil 120 which thus energized will draw its armature 121 toward it so as to close a circuit through the electro-magnets 100 to cause the latter to swing the latch-bar 90 and release the starting-and-stopping bar 48 to the action of its springs 68 for the purpose of stopping all of the movements.

For the purpose of starting and stopping the balance-wheel 86 of the master-movement 87 I provide a starting-and-stopping arm 122 carrying at its forward end a yielding starting-and-stopping finger 123 and corresponding generally to the starting-and-stopping arms 47 of the test-units but instead of being frictionally coupled to the starting-and-stopping bar 48 it is frictionally pivoted by means of a stud 124 to the forward end of a short link 125 which in turn is frictionally pivoted at its rear end to the upper face of the frame-piece.

The upper end of the stud 124 carries a roller 126 entering a groove 127 extending parallel with the starting-and-stopping bar 48 and formed in a block 128 secured by screws 129 to the under face of the said starting-and-stopping bar 48. From this arrangement it will be seen that when the starting-and-stopping bar 48 moves longitudinally it will not affect the starting-and-stopping arm 122 owing to the free movement of the stud 124 in the groove 127. However, when the said starting-and-stopping bar 48 moves transversely the roller 126 will be moved by the walls of the groove 127 and correspondingly move the starting-and-stopping arm 122 together with its starting-and-stopping finger 123.

For the purpose of restoring the starting-and-stopping arm 122 to its normal position in which its finger 123 engages the balance-wheel 86 I provide a short forwardly-extending bracket 130 secured at its rear end by screws 131 to the upper face of the starting-and-stopping bar 48 and provided at its forward end with a re-setting pin 132 adapted to engage the left-hand end of the starting-and-stopping arm 122.

In the operation of my improved testing apparatus after the completion of one test cycle and when the parts are in their at rest positions in which they are shown in Figs. 1 to 8 inclusive and Fig. 10, the operator rocks in turn the starting-and-stopping arms 47 of the several test-movements from the position shown by full lines in Fig. 5 to the position in which it is shown in broken lines therein, thus disengaging the starting-and-stopping finger 52 from the periphery of the unit just tested and simultaneously causing the back-off finger 44 to engage the ratchet-wheel 27 and move the same slightly in a reverse direction from its normal travel and so as to relieve the gear-train 24 of the test-movement in question, of any driving force.

By glancing at the pointers 39 and 40 the operator determines whether or not the particular balance-wheel unit just tested has run within prescribed limits of accuracy. It may be here stated that in the particular test-movements shown, sub-divisions of the graduations surrounding the openings 41 are represented by the graduations surrounding the opening 41ª; the relatively fast-moving pointer 40 completing one revolution during the movement of the slow-moving pointer 39 from one graduation to the next. If the pointers indicate that the balance-wheel unit is accurate, or so nearly so that a correction can be made by the operator without another trial run, the hair-spring of the said unit is bent at a predetermined point and the unit removed from the test-movement and replaced by another balance-wheel unit to be tested.

The operator then moves to the next test-movement and proceeds as above until all of the balance-wheel units just tested have been checked and if satisfactory removed from the unit and if not re-adjusted and left in place for another trial run.

When all of the balance-wheel units in the various test-movements have thus received attention the apparatus is in readiness for a test run. To effect this the operator swings a yoke-shaped switch-operating handle 133 pivoted to a switch-box 134 from right to left into the position indicated by broken lines in Fig. 1. The switch mechanism located within the casing 134 and which requires no detailed description starts an electric motor indicated by broken lines 135 in Fig. 1 so that the same through a worm 136 formed upon its forwardly-extending shaft 137 and meshing into worm-wheel teeth 138 cut upon the periphery of the cam 77, effects the rotation of the cam-shaft 57 together with the four cams 58, 61, 76 and 77 thereon, in a clockwise direction.

Immediately the cam-shaft 59 starts its rotation the cam 58 will act to move the starting-and-stopping bar 48 from right to left with the effect of moving the starting-and-stopping arms 47 of the several test-movements against their respective stop-pins 56, so that the said arms are moved from an inclined position indicated by broken lines in Fig. 5 to a position perpendicular to the bar 48 as indicated by full lines in the same figure. This straightening up of the starting-and-stopping arms permits the back-off fingers 44 respectively actuated thereby to move out of engagement with their complementary ratchet-wheels 27 and thus release the several trains 24 to the action of their driving-weights 31.

The cam 58 now permits the springs 68 to move the starting-and-stopping bar from left to right with the effect of re-engaging the starting-and-stopping fingers 52 with their respective balance-wheels so as to hold the latter against oscillation. During the movements of the starting-and-stopping bar from right to left and return as above described the latch-pin 88 rides idly back and forth upon the upper face of the pivotal guard-dog 92 which thus prevents the latch-bar 90 from swinging so as to close the circuit through the fingers 96 and 97.

It is to be noted that during the movement of the starting-and-stopping bar 48 from right to left and from left to right the starting-and-stopping arm 122 has not been moved as have the several starting-and-stopping arms 47, owing to the slotted connection between them and the said starting-and-stopping bar, so that the master-movement 87 remains at rest during the re-setting of the arms 47 of the test-movements.

As soon as the starting-and-stopping bar has completed its movement from left to right the cam 76 will act to move the indexing-bar 72 a short distance from right to left so that the indexing-fingers 74 and 75 are moved out of the notches 43 and into the circular sight-openings 41 and 41ª. The cam 76 continues to urge the indexing-bar 72 from right to left, but at this particular time the cam 77 comes into action to cause the said indexing-bar to move rearward, which movement coupled with the longitudinal movement imparted by the cam 76 and the springs 85, will cause the indexing-bar to move anti-clockwise in a circular path together with the indexing-fingers 74 and 75 for one and one-quarter turns, thus causing the said fingers to rotate the pointers 39 and 40 and move them into registration with the zero marks upon the edge of their respective openings 41 and 41ª. After the indexing-bar and fingers reach this position the two cams 76 and 77 are so shaped and coordinated as to cause the bar and fingers to move reversely one-quarter turn in a clockwise direction and then to retire the fingers 74 and 75 into the notches 43 and out of the path of the said pointers.

At the conclusion of the indexing operation just above described the cam 61 acts to permit the starting-and-stopping bar 48 to move rearward a short distance under the urge of its springs 68 with the effect of wiping the several starting-and-stopping fingers 52 across the balance-wheels 19 of the respective test-movements and correspondingly moving the starting-and-stopping finger 123 across the balance-wheel 86 of the master-movement so as to simultaneously start all of the said movements. This rearward movement of the starting-and-stopping bar moves its latch-pin 88 rearward out of line with the rear edge of the dog 92 as shown in Fig. 10ª.

The cam 58 now acts to move the starting-and-stopping bar from right to left a distance sufficient to move the latch-pin 88 to the left of the complementary latch-pin 89 as shown in Fig. 10ᵇ, thus permitting the forward end of the said latch-bar to rise, by virtue of the excess weight at its opposite end, thereby aligning the contact-plate 95 with the inwardly-turned lower ends of the contact-arms 96 and 97 so as to electrically connect them. The bar 48 is now moved forward by the cam 61 so as to virtually hook the pin 88 in engagement with the left face of the pin 89 (Fig. 10ᶜ) so that the said bar is thereby latched in its left-hand position against the counter-urge of its springs 68. During this last-mentioned movement of the bar 48 and pin 88 the dog 92 has been swung forward against the tension of its spring 93.

At the conclusion of the latching of the starting-and-stopping bar in its left-hand position, the motor 135, and hence the cam-shaft and cams 58, 61, 76 and 77 coupled thereto, is automatically stopped by a stop-pin 139 which projects upward from the cam 76 and engages an extension 140 upon the lower arm of the yoke-shaped switch-operating handle 133 so as to turn the same into its off position. The automatic movement of the said handle operates the switch-mechanism within the switch-box 134 and shuts off the current to the motor. All of the test-movements, however, as well as the master-movement, continue to operate under the urge of the driving-weights 31 and 106 respectively.

Electrical connection having been made between the contact-fingers 96 and 97 by the movement of the latch-bar 90 as above described, the relatively slow rotation of the contact-fingers 111 and 112 with the third-wheel arbor 109 and the relatively fast rotation of the contact-finger 114 with the escapement-wheel arbor 116 will, in a predetermined interval, arrive at a position where the finger 111 will engage with the finger 113 and the finger 112 will engage with the finger 114, thus closing a circuit through the very sensitive relay 120 via the fingers 96 and 97 and the plate 95, causing the said relay to attract its armature 121 and so as to close an electric circuit through the magnets 100.

This energization of the magnet 100 will lift the rear end of the latch-bar 90 and correspondingly lower the outer end thereof with the effect of simultaneously disengaging the latch-pin 89 from the latch-pin 88, and of moving the contact-plate 95 out of engagement with the inwardly-turned ends of the contact-arms 96 and 97 thereby breaking the circuit through the said magnet as well as through the contact-fingers of the master-movement as will be apparent from the diagrammatic wiring scheme shown in Fig. 11.

As soon as the latch-pin 89 is disengaged from the pin 88 of the starting-and-stopping bar 48 the same will be immediately snapped from left to right by its springs 68, with the effect of moving the several starting-and-stopping fingers 52 into engagement with their respective balance-wheels and also of causing the stop-pin 132 to move the startingand-stopping finger 123 into engagement with the balance-wheel 86 of the master-movement, thereby simultaneously causing the stoppage of all of the test-movements as well as the master-movement.

With the machine thus at rest the operator proceeds to observe the degree to which each of the several balance-wheel units just tested have varied from a predetermined standard, and if within a prescribed range the hair-springs are bent at a predetermined point and the unit removed from the machine and replaced by another balance-wheel unit to be tested. Such of the balance-wheel units just tested as do not operate within a prescribed range are re-set and left in place for another test. One cycle of the operation of my improved apparatus is thus complete and the parts are in position to again move through the various phases of the cycle previously described.

I claim:

1. An apparatus of the class described, comprising a test-movement adapted to receive a balance-wheel-unit to be tested and provided with an indicator for registering the oscillations of the said unit during a predetermined test-period; a master-movement; a stop-member engageable with running parts of both of said movements; and automatic means controlled by the said master-movement for causing the said stop-member to simultaneously stop both movements at the termination of a predetermined test-period.

2. An apparatus of the class described, comprising a test-movement adapted to receive a balance-wheel-unit to be tested and provided with an indicator for registering the oscillations of the said unit during a predetermined test-period; a master-movement; a stop-member engageable with running parts of both of said movements; and automatic electro-magnetic means electrically controlled by the said master-movement for causing the said stop-member to simultaneously stop both movements at the termination of a predetermined test-period.

3. An apparatus of the class described, comprising a test-movement adapted to receive a balance-wheel-unit to be tested and provided with an indicator for registering the oscillations of the said unit during a predetermined test-period; a master-movement; a stop-member engageable with running parts of both of said movements; a prime-mover; automatic means operated by the said prime-mover for disengaging the said stop-member from the said movements; and automatic means controlled by the said master-movement for causing the said stop-member to simultaneously stop both movements at the termination of a predetermined test-period.

4. An apparatus of the class described, comprising a test-movement adapted to receive a balance-wheel-unit to be tested and provided with an indicator for registering the oscillations of the said unit during a predetermined test-period; a master-movement; a stop-member engageable with running parts of both of said movements; a prime-mover; automatic means operated by the said prime-mover for disengaging the said stop-member from the said movements; and automatic electro-magnetic means electrically controlled by the said master-movement for causing the said stop-member to simultaneously stop both movements at the termination of a predetermined test-period.

5. An apparatus of the class described, comprising a test-movement adapted to receive a balance-wheel-unit to be tested and provided with an indicator for registering the oscillations of the said unit during a predetermined test-period; a prime-mover; an automatic resetting-member operable by the said prime-mover to return the said indicator to its starting position; a master-movement; a stop-member engageable with running parts of both of said movements; and automatic means controlled by the said master-movement for causing the said stop-member to simultaneously stop both movements at the termination of a predetermined test-period.

6. An apparatus of the class described, comprising a test-movement adapted to receive a balance-wheel-unit to be tested and provided with an indicator for registering the oscillations of the said unit during a predetermined test-period; a prime-mover; an automatic resetting-member operable by the said prime-mover to return the said indicator to its starting position; means operated by the said prime-mover for imparting both rotary and rectilinear movement to the said resetting-member; a master-movement; a stop-member engageable with running parts of both of said movements; and automatic means controlled by the said master-movement for causing the said stop-member to simultaneously stop both movements at the termination of a predetermined test-period.

7. An apparatus of the class described, comprising a test-movement adapted to receive a balance-wheel-unit to be tested and provided with complementary coordinated fast and slow indicators for registering the oscillations of the said unit during a predetermined test-period; a master-movement; a stop-member engageable with running parts of both of said movements; and automatic means controlled by the said master-movement for causing the said stop-member to simultaneously stop both movements at the termination of a predetermined test-period.

8. An apparatus of the class described, comprising a test-movement adapted to receive a balance-wheel-unit to be tested and provided with complementary coordinated fast and slow indicators for registering the oscillations of the said unit during a predetermined test-period; a master-movement; a stop-member engageable with running parts of both of said movements; and automatic electro-magnetic means electrically controlled by the said master-movement for causing the said stop-member to simultaneously stop both movements at the termination of a predetermined test-period.

9. An apparatus of the class described, comprising a test-movement adapted to receive a balance-wheel-unit to be tested and provided with complementary coordinated fast and slow indicators for registering the oscillations of the said unit during a predetermined test-period; a prime-mover; an automatic resetting-member operable by the said prime-mover to return the said indicators to their starting positions; a master-movement; a stop-member engageable with running parts of both of said movements; and automatic means controlled by the said master-movement for causing the said stop-member to simultaneously stop both movements at the termination of a predetermined test-period.

10. An apparatus of the class described, comprising a test-movement adapted to receive a balance-wheel-unit to be tested and provided with complementary coordinated fast and slow indicators for registering the oscillations of the said unit during a predetermined test-period; a prime-mover; an automatic resetting-member operable by the said prime-mover to return the said indicators to their starting positions; means operated by the said prime-mover for imparting both rotary and rectilinear movement to the said resetting-member; a master-movement; a stop-member engageable with running parts of both of said movements; and automatic means controlled by the said master-movement for causing the said stop-member to simultaneously stop both movements at the termination of a predetermined test-period.

11. An apparatus of the class described, comprising a test-movement adapted to receive a balance-wheel-unit to be tested and provided with an indicator for registering the oscillations of the said unit during a predetermined test-period; a master-movement; a stop-member engageable with running parts of both of said movements; yielding means normally urging the said stop-member into engagement with the said running parts; and a latch-mechanism adapted to hold the said stop-member out of engagement with the said running parts against the counter-urge of the said yielding means and controlled by the said master-movement for releasing the said stop-member to simultaneously stop both movements at the termination of a predetermined test-period.

12. An apparatus of the class described, comprising a test-movement adapted to receive a balance-wheel-unit to be tested and provided with an indicator for registering the oscillations of the said unit during a predetermined test-period; a master-movement; an electric switch-mechanism operated by the said master-movement; a stop-member engageable with running parts of both of said movements; yielding means normally urging the said stop-member into engagement with the said running parts; a latch-mechanism adapted to releasably hold the said stop-member out of engagement with the said running parts; an electro-magnet for operating the said latch-mechanism; and connections between the said switch-mechanism and the said magnet for energizing the latter to operate the latch-mechanism and release the said stop-member to simultaneously stop both movements at the termination of a predetermined test-period.

13. An apparatus of the class described, comprising a test-movement adapted to receive a balance-wheel-unit to be tested and provided with an indicator for registering the oscillations of the said unit during a predetermined test-period; a master-movement; a stop-member engageable with running parts of both of said movements; and automatic means including a releasing-magnet and a relay electrically controlled by the said master-movement for causing the said stop-member to simultaneously stop both movements at the termination of a predetermined test-period.

14. An apparatus of the class described, comprising a test-movement adapted to receive a balance-wheel-unit to be tested and provided with an indicator for registering the oscillations of the said unit during a predetermined test-period; a master-movement; a switch-mechanism operated by the said master-movement and including a slow-moving contact and a complementary fast-moving contact; a stop-member engageable with running parts of both of said movements; and automatic electro-magnetic means controlled by the said switch-mechanism for causing the said stop-member to simultaneously stop both movements at the termination of a predetermined test-period.

15. An apparatus of the class described, comprising a test-movement adapted to receive a balance-wheel-unit to be tested and provided with an indicator for registering the oscillations of the said unit during a predetermined test-period; a master-movement; a switch-mechanism operated by the said master-movement and including a slow-moving contact and a complementary fast-moving contact; a stop-member engageable with running parts of both of said movements; automatic means for disengaging the said stop-member from the said movements; and automatic electro-magnetic means controlled by the said switch-mechanism for causing the said stop-member to simultaneously stop both movements at the termination of a predetermined test-period.

16. An apparatus of the class described, comprising a test-movement adapted to receive a balance-wheel-unit to be tested and provided with an indicator for registering the oscillations of the said unit during a predetermined test-period; a master-movement; a stop-member provided with a stop-finger engageable with a running part of the master-movement, and a second stop-finger engageable with a running part of the said test-movement, the latter finger being frictionally coupled to the said stop-member; and automatic means controlled by the said master-movement for causing the said stop-fingers to simultaneously stop both movements at the termination of a predetermined test-period.

17. An apparatus of the class described, comprising a test-movement adapted to receive a balance-wheel-unit to be tested and provided with an indicator for registering the oscillations of the said unit during a predetermined test-period; a master-movement; a stop-member provided with a stop-finger engageable with a running part of the master-movement, and a second stop-finger engageable with a running part of the said test-movement, the latter finger being frictionally coupled to the said stop-member; means constructed and arranged to impart to the said stop-member in the order named a longitudinal movement, a transverse movement and a second longitudinal movement; an abutment positioned to be engaged by the last-mentioned stop-finger for resetting the same when the said stop-member is moved longitudinally; and automatic means controlled by the said master-movement for causing the said stop-fingers to simultaneously stop both movements at the termination of a predetermined test-period.

18. An apparatus of the class described, comprising a test-movement adapted to receive a balance-wheel-unit to be tested and provided with an indicator for registering the oscillations of the said unit during a predetermined test-period; a master-movement; a stop-member engageable with running parts of both of said movements; yielding means normally urging the said stop-member into engagement with the said running parts; means constructed and arranged to impart to the said stop-member in the order named a longitudinal movement, a transverse movement and a second longitudinal movement; a latch-mechanism adapted to hold the said stop-member out of engagement with the said running parts against the counter-urge of the said yielding means and controlled by the said master-movement for releasing the said stop-member to simultaneously stop both movements at the termination of a predetermined test-period; and a guard-dog arranged to prevent the said latch-mechanism from acting to latch the said stop-member during the first mentioned longitudinal movement of the latter.

19. An apparatus of the class described, comprising a test-movement adapted to receive a balance-wheel-unit to be tested and provided with an indicator for registering the oscillations of the said unit during a predetermined test-period; a master-movement; a switch-mechanism operated by the said master-movement and including a stationary contact, a slow-moving contact and a complementary fast-moving contact; a stop-member engageable with running parts of both of said movements; and automatic electro-magnetic means controlled by the said switch-mechanism for causing the said stop-member to simultaneously stop both movements at the termination of a predetermined test-period.

In testimony whereof, I have signed this specification.

FREDERICK FRANZ.